Figure 1:
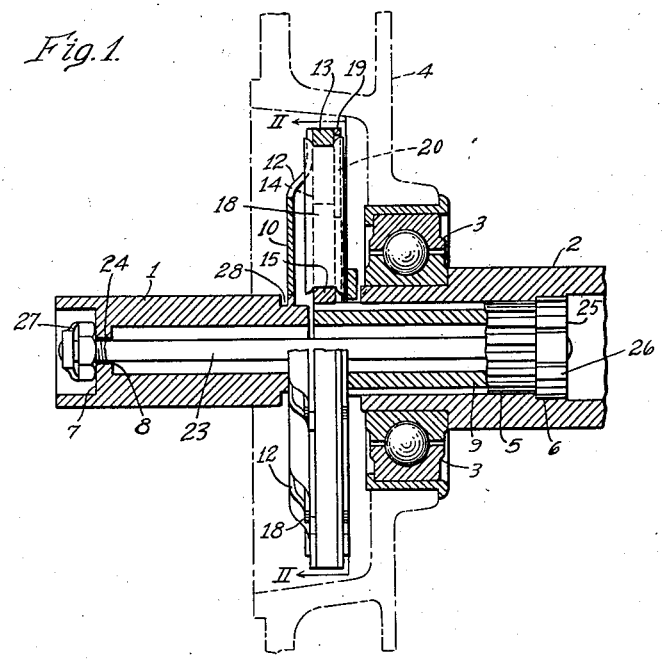

June 26, 1945.  J. E. MULHEIM  2,379,175
RESILIENT SHAFT COUPLING
Filed Feb. 18, 1943   2 Sheets-Sheet 1

WITNESSES:
C. J. Weller.
F. P. Lyle

INVENTOR
Joseph E. Mulheim.
BY O. D. Buchanan
ATTORNEY

June 26, 1945.  J. E. MULHEIM  2,379,175
RESILIENT SHAFT COUPLING
Filed Feb. 18, 1943  2 Sheets-Sheet 2
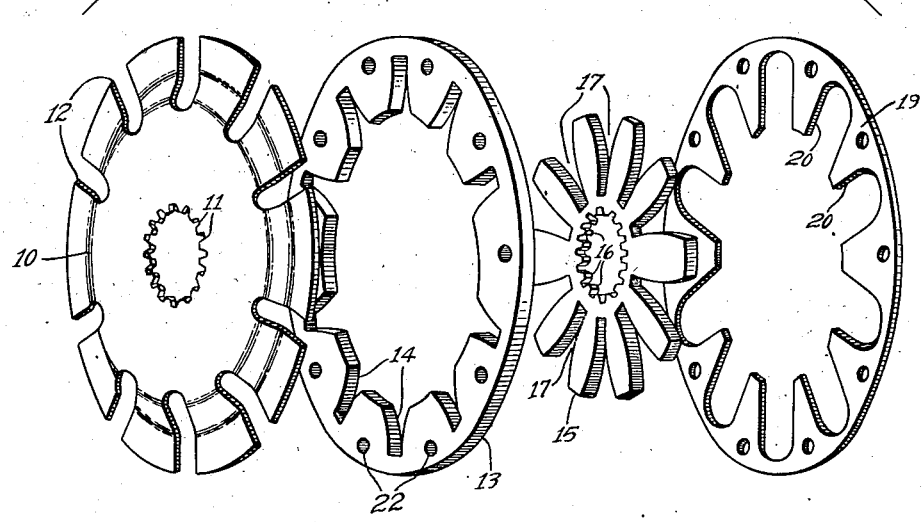
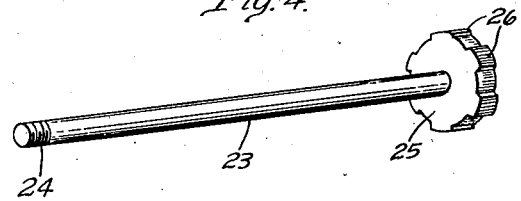
WITNESSES:
INVENTOR
Joseph E. Mulheim.
BY
ATTORNEY Patented June 26, 1945

2,379,175

UNITED STATES PATENT OFFICE 2,379,175

RESILIENT SHAFT COUPLING

Joseph E. Mulheim, Lima, Ohio, assignor to Westinghouse Electric Corporation, East Pittsburgh, Pa., a corporation of Pennsylvania Application February 18, 1943, Serial No. 476,303

12 Claims. (Cl. 64—15)

The present invention relates to shaft couplings, and more particularly to a resilient coupling of light weight and compact design.

The shaft coupling of the present invention is especially adapted for use in connecting the armature shaft of an aircraft generator to its driving shaft, although its usefulness is not limited to this particular application. Generators used to supply the electrical load on airplanes are customarily driven from the air plane engine by means of a drive shaft which is connected to the engine shaft by gears. If a rigid coupling were used to connect the drive shaft to the generator shaft, the inertia of the generator armature would cause excessive shock loads on the driving gears under rapid acceleration or deceleration of the engine, and undesirable shock loads at all times because of the pulsating torque of the internal combustion engine. For this reason, it is necessary to use a resilient or flexible coupling which is capable of permitting sufficient relative torsional motion between the drive shaft and the generator shaft to absorb the shocks and protect the driving gears. The requirements for a coupling for this service are rather exacting since the coupling must be of light weight and of small dimensions, especially in the axial direction, but it must have a high degree of reliability and must have sufficient torque capacity to drive the generator without excessive wear of the coupling parts.

The principal object of the present invention is to provide a resilient shaft coupling, especially suitable for use in connection with aircraft generators, which is of light weight and compact design, and which is capable of protecting the driving gears from excessive shock loads.

A further object of the invention is to provide a resilient shaft coupling which is capable of operating continuously for relatively long periods at its critical speed without causing excessive vibration or wear.

Another object of the invention is to provide a resilient coupling which will permit a small amount of both angular and lateral misalignment between the driving shaft and the driven shaft and which can operate with such misalignment without causing excessive wear.

Still another object of the invention is to provide a resilient coupling for aircraft generators which has minimum axial dimensions and weight, but which has sufficient torque capacity to drive the generator without excessive wear, and which will rupture under a predetermined excess torque to interrupt the drive and protect the driving gears in case of sticking or jamming of the driven shaft.

Figure 2:
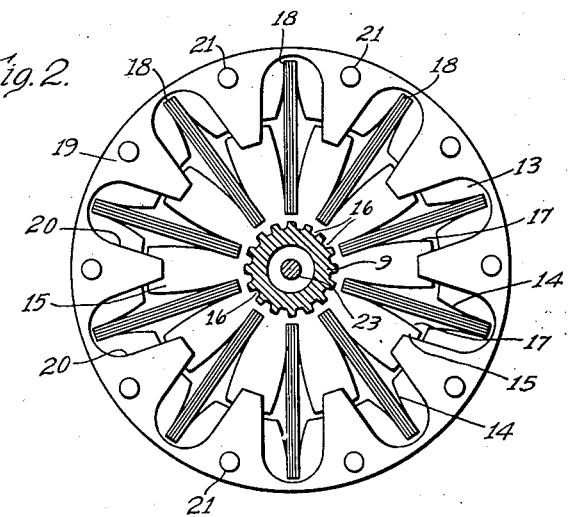

Further objects and advantages of the invention will be apparent from the following detailed description, taken in connection with the accompanying drawings, in which:

Figure 1 is a longitudinal sectional view, partly in elevation, of a coupling embodying the invention, Fig. 2 is a transverse view partly in section on the line II—II of Fig. 1, Fig. 3 is an exploded perspective view showing certain of the parts of the coupling, and Fig. 4 is a perspective view of a retaining member.

The drawings show a resilient shaft coupling embodying the invention and connecting a drive shaft 1 to a driven shaft 2, which may be the armature shaft of a generator such as is used on aircraft. The armature shaft 2 is supported in ball bearing 3 mounted in the end bracket 4 of the generator. The end bracket 4 may be of any suitable construction and has not been shown in detail since it forms no part of the invention. The generator shaft 2 is made hollow throughout its length and has internal splines, indicated at 5, cut in it at the driving end. The shaft 2 also has an internal shoulder 6 in the splined portion which is formed by a portion of the shaft of greater internal diameter than the end portion so as to form a shoulder. The enlarged portion which forms the shoulder 6 is also splined, but because of its greater diameter, the splines are of less depth than those at the end of the shaft.

The drive shaft 1 is shown as a relatively short stub shaft, which preferably has external splines cut on it for engagement with a correspondingly splined driving gear (not shown). The drive shaft 1 is also made hollow and has an internal flange near the end with a central opening 8, forming an internal shoulder 7. The drive shaft 1 is resiliently connected to a hollow stub shaft 9, which is externally splined, and which is adapted to fit into the hollow armature shaft 2 with its external splines engaging the internal splines of the shaft 2 to effect a driving connection, and with the end of the stub shaft 9 extending out of the shaft 2.

A support plate 10 of sheet metal is mounted adjacent the end of the drive shaft 1. The support plate 10 has a central opening with teeth 11 cut in it for engagement with the splines of the shaft 1, and the plate 10 is secured to the shaft 1 by brazing, or in any other suitable manner. As clearly shown in Figs. 1 and 3, the plate 10 is dished so that its periphery is in a different plane from its central portion, and it has a plurality of generally radial slots or notches 12 formed in its periphery. A spring anchor 13 is attached to the support plate 10 to provide a support for one end of the springs which effect the resilient drive connection. The spring anchor 13 may be made of sheet metal of suitable thickness and is of generally annular shape, as shown in Fig. 3. A plurality of radial slots 14 corresponding in number and angular position to the notches 12 is formed in the inner periphery of the annular spring anchor 13. As shown in Figs. 2 and 3, the walls of the slots 14 are not parallel, but are curved so that the slots are wider at their inner ends than at their outer ends. The anchor 13 is attached to the support plate 10 at its outer periphery by any suitable means, such as spot welding, with the slots 14 coinciding in position with the notches 12.

A second spring anchor 15 is secured to the extending end of the stub shaft 9. The anchor member 15, as clearly seen in Figs. 2 and 3, is generally circular and has a central opening which has teeth 16 formed in its periphery for engagement with the splines of the shaft 9, and the anchor 15 is secured to the shaft 9 by brazing, or other suitable means. The anchor 15 has a plurality of radial slots 17 in its periphery corresponding in number to the slots 14. The slots 17 have curved sides similar to those of the slots 14, and the anchors 13 and 15 are positioned on their respective shafts so that they lie in the same plane and so that their slots coincide in angular position, as clearly shown in Figs. 1 and 2.

The resilient drive between the drive shaft 1 and the stub shaft 9 is effected by means of flat leaf springs 18, which are supported in the slots 14 and 17 of the spring anchors. As clearly seen in Fig. 1, the springs have notched ends which fit over the anchor members, and a pack consisting of a plurality of springs 18 is placed in each pair of opposed slots 14 and 17, the springs being retained in position by the engagement of their notched ends with the anchors.

In order to prevent axial separation of the two anchor members, a retaining plate 19 is provided. The plate 19 is annular in shape, and has a plurality of wide, generally radial slots or notches 20 in its inner periphery. The notches 20 correspond in number to the slots 14 and 17, and after the springs 18 have been assembled in the two anchor members, the retaining plate 19 is attached to the anchor 13 on the side opposite the support plate 10 in any suitable manner, as by means of rivets 21 which may be placed in holes 22 in the periphery of the anchor 13 prior to assembly and headed over after the plate 19 is put into position. The radial width of the plate 19 is great enough so that it overlaps the spring anchor 15 to retain it against axial movement with respect to the anchor 13, so that both anchors are held in the same plane. The notches 20 in the retaining plate 19 and the notches 12 in the support plate 10 are positioned opposite the radial slots 14 and 17 of the spring anchors, so that there is no interference between the plates 10 and 19 and the springs 18, the edges of which protrude through the notches. Thus, a resilient connection is provided between the shafts 1 and 9 which is capable of transmitting the necessary torque between them, and the stub shaft 9 drives the armature shaft 2 by reason of its splined engagement with the shaft 2.

The coupling is retained in position in the shaft 2 by means of an elongated retaining member 23. The retaining member 23 may be a long stud or bolt, which is threaded at one end, as indicated at 24, and which is secured in a head 25 at its other end. The head 25 is a metal plug or disc which has splines or serrations 26 on its outer periphery which are adapted to engage the internal splines of the generator shaft 2, and the head 25 is made of the proper diameter to fit in the hollow generator shaft 2 and to engage against the internal shoulder 6.

In assembling the coupling on the shaft 2, the retaining member 23 is first inserted from the opposite end of the shaft 2, that is, the right-hand end as seen in Fig. 1, until the head 25 engages the shoulder 6. The coupling itself, consisting of the stub shaft 9 and drive shaft 1 with their resilient connection, is then passed over the extending retaining member 23, and the stub shaft 9 is pushed into the shaft 2 with their splines engaging. The retaining member 23 is made long enough so that its end extends through the central opening 8 of the shoulder 7 in the drive shaft 1, and the coupling is retained in position by means of a lock nut 27 which is threaded on the end of the retaining member 23 and bears against the shoulder 7, so that relative axial movement of the drive shaft 1, stub shaft 9 and driven shaft 2 is prevented.

It should now be apparent that a resilient shaft coupling has been provided which can be made of light weight and of very compact dimensions. The use of the externally splined stub shaft 9 fitting into the hollow driven shaft 2 permits the overall axial length of the coupling to be kept small, while at the same time a large enough area of engagement is provided between the cooperating splines which drive the shaft 2 to insure adequate torque capacity. The drive shaft 1 has a reduced section 28 cut in it adjacent the end on which the support plate 10 is secured, and in case the generator armature should stick or jam for any reason, such as failure of a bearing, the reduced section 28 of the shaft 1 will rupture at a predetermined excess torque, thus interrupting the drive and protecting the drive gears from damage.

The use of the elongated retaining member 23 makes it possible to use the stub shaft 9 with the internally splined driven shaft 2, since it provides a simple and reliable means for retaining the coupling in position in the shaft 2, and greatly facilitates the assembly of the coupling on the shaft. The use of the long, relatively small-diameter retaining member 23 also has another important advantage since it has sufficient clearance in the hollow shafts 1 and 9 and through the opening 8 to permit a small amount of misalignment between the shafts 1 and 2. The manufacturing clearances between the springs 18 and anchors 13 and 15 are such that a certain amount of play is permitted, and this effect in connection with the clearance between the retaining member 23 and the shafts 1 and 9 makes it possible for the coupling to operate satisfactorily and without excessive wear even where a small amount of angular or lateral misalignment between the shafts 1 and 2 is present. This is an important advantage of the invention, since it is not always practicable in mounting a generator in place in an airplane to obtain absolutely perfect alignment between the generator shaft and the drive shaft.

The resilient spring connection permits operation of the coupling at critical speeds because of the configuration of the slots 14 and 17. As described above, the sides of these slots are curved, and it will be apparent from Fig. 2 that as the two anchors 13 and 15 move angularly with respect to each other and thus deflect the springs 18, the effective length of the springs between their points of support on the anchors will be decreased, thus increasing the stiffness of the packs of springs. This change in the spring constant as the springs deflect progressively changes the natural frequency of vibration of the coupling, so that it can operate at critical speeds without excessive wear or vibration because of the variable natural frequency, and also because of the damping caused by the frictional rubbing of the adjacent springs in each of the spring packs. It is recognized that spring arrangements having this characteristic of variable natural frequency have been used before, but the present invention provides an advantageous construction employing this principle which can readily be designed to have reasonably high torque capacity with light weight, and which is easily and rapidly assembled.

It should now be apparent, therefore, that a resilient coupling has been provided which is especially well suited for use with aircraft generators, and which meets the rather exacting requirements of this service in a very satisfactory manner. It is to be understood, of course, that various modifications and embodiments of the invention are possible. Thus, the usefulness of the stub shaft 9 fitting into a hollow driven shaft with the retaining member 23 to hold the driving shaft, driven shaft and stub shaft in position is not restricted to its use with the particular form of resilient connection between the driving shaft and stub shaft shown and described, although it has been found that this type of resilient connection is particularly suitable for aircraft generator couplings. Other means for effecting the resilient connection between the driving shaft and stub shaft might be used, however, and it will be apparent that various other modifications might be made within the scope of the invention. It is to be understood, therefore, that the invention is not limited to the exact construction shown and described for the purpose of illustration, but that in its broadest aspects, it includes all equivalent embodiments and modifications which come within the scope of the appended claims.

I claim as my invention:

1. A shaft coupling for connecting a driving shaft and a hollow driven shaft, said coupling comprising a stub shaft adapted to fit into said hollow driven shaft, means for effecting a driving connection between said stub shaft and said driven shaft, resilient means for connecting said driving shaft to said stub shaft to effect a driving connection therebetween, said driving shaft and stub shaft being hollow, and retaining means extending axially through said driving shaft and stub shaft into the driven shaft for preventing axial separation of the driving shaft, stub shaft and driven shaft.

2. A shaft coupling for connecting a driving shaft and a hollow driven shaft, said coupling comprising a stub shaft adapted to fit into said hollow driven shaft, means for effecting a driving connection between said stub shaft and said driven shaft, resilient means for connecting said driving shaft to said stub shaft to effect a driving connection therebetween, said driving shaft and stub shaft being hollow, and an elongated member extending axially through said driving shaft and stub shaft into the driven shaft, said elongated member being engaged with said driving shaft and with said driven shaft so as to prevent axial separation of said shafts.

3. A shaft coupling for connecting a driving shaft and a driven shaft, said driven shaft being hollow and having splines on its internal surface, said coupling comprising a stub shaft adapted to fit into said hollow driven shaft and having splines adapted to cooperate with the internal splines of the driven shaft to effect a driving engagement therewith, resilient means for connecting said driving shaft to said stub shaft to effect a driving connection therebetween, said driving shaft and stub shaft being hollow, an elongated member extending through said hollow shafts, said elongated member having a head at one end thereof, internal abutment means in said hollow driven shaft, said head bearing against said abutment means and having splines adapted to engage the internal splines of the driven shaft, whereby said elongated member is held in fixed axial position with respect to the driven shaft, and means at the opposite end of the elongated member for engaging the driving shaft to prevent axial separation of the driving shaft, stub shaft and driven shaft.

4. A shaft coupling for connecting a driving shaft and a hollow driven shaft, said coupling comprising a stub shaft adapted to fit into said hollow driven shaft, means for effecting a driving connection between said stub shaft and said driven shaft, a first anchor member secured to the extending end of said stub shaft, said anchor member being circular and having a plurality of generally radial slots therein, a dished support plate secured to said driving shaft, said support plate having a plurality of radial notches therein, a second anchor member, said second anchor member being annular and having a plurality of radial slots in its inner periphery, the outer periphery of the second anchor member being secured to the outer periphery of said support plate in the spaces between the notches of the support plates with said notches and radial slots coinciding in position, said two anchor members being disposed in the same plane with their radial slots coinciding in angular position, a plurality of flat leaf spring members disposed in said slots to effect a resilient driving connection between said anchor members, and retaining means for preventing axial separation of said anchor members.

5. A shaft coupling for connecting a driving shaft and a hollow driven shaft, said coupling comprising a stub shaft adapted to fit into said hollow driven shaft, means for effecting a driving connection between said stub shaft and said driven shaft, a first anchor member secured to the extending end of said stub shaft, said anchor member being circular and having a plurality of generally radial slots therein, a dished support plate secured to said driving shaft, said support plate having a plurality of radial notches therein, a second anchor member, said second anchor member being annular and having a plurality of radial slots in its inner periphery, the outer periphery of the second anchor member being secured to the outer periphery of said support plate in the spaces between the notches of the support plate with said notches and radial slots coinciding in position, said two anchor members being disposed in the same plane with their radial slots coinciding in angular position, a plurality of flat leaf spring members disposed in said slots to effect a resilient driving connection between said anchor members, and a retaining plate secured to the second anchor member on the side opposite the support plate, said retaining plate having portions extending over the first anchor member to prevent axial separation of the anchor members.

6. A shaft coupling for connecting a driving shaft and a hollow driven shaft, said coupling comprising a stub shaft adapted to fit into said hollow driven shaft, means for effecting a driving connection between said stub shaft and said driven shaft, a first anchor member secured to the extending end of said stub shaft, said anchor member being circular and having a plurality of generally radial slots therein, a second anchor member supported from said driving shaft to be driven thereby, said second anchor member being annular and having a plurality of radial slots in its inner periphery, said two anchor members being disposed in the same plane with their radial slots coinciding in angular position, a plurality of flat leaf spring members disposed in said slots to effect a resilient driving connection between said anchor members, retaining means for preventing axial separation of said anchor members, said driving shaft and stub shaft being hollow, an elongated member extending through said driving shaft and stub shaft, means at one end of said elongated member for retaining said member in fixed axial position with respect to said driven shaft, and means at the opposite end of said elongated member for engaging the driving shaft to prevent axial separation of said driving shaft, stub shaft and driven shaft.

7. A shaft coupling for connecting a driving shaft and a hollow driven shaft, said coupling comprising a stub shaft adapted to fit into said hollow driven shaft, means for effecting a driving connection between said stub shaft and said driven shaft, a first anchor member secured to the extending end of said stub shaft, said anchor member being circular and having a plurality of generally radial slots therein, a second anchor member supported from said driving shaft to be driven thereby, said second anchor member being annular and having a plurality of radial slots in its inner periphery, said two anchor members being disposed in the same plane with their radial slots coinciding in angular position, a plurality of flat leaf spring members disposed in said slots to effect a resilient driving connection between said anchor members, retaining means for preventing axial separation of said anchor members, said driving shaft having a reduced section adapted to rupture under a predetermined excess torque, said driving shaft and stub shaft being hollow, an elongated member extending through said driving shaft and stub shaft, means at one end of said elongated member for retaining said member in fixed axial position with respect to said driven shaft, and means at the opposite end of said elongated member for engaging the driving shaft to prevent axial separation of said drivng shaft, stub shaft and driven shaft.

8. A shaft coupling for connecting a driving shaft and a hollow driven shaft, said coupling comprising a stub shaft adapted to fit into said hollow driven shaft, means for effecting a driving connection between said stub and said driven shaft, a first anchor member secured to the extending end of said stub shaft, said anchor member being circular and having a plurality of generally radial slots therein, a second anchor member supported from said driving shaft to be driven thereby, said second anchor member being annular and having a plurality of radial slots in its inner periphery, said two anchor members being disposed in the same plane with their radial slots coinciding in angular position, a plurality of flat leaf spring members disposed in said slots to effect a resilient driving connection between said anchor members, retaining means for preventing axial separation of said anchor members, said driving shaft and stub shaft being hollow, an elongated member extending through said driving shaft and stub shaft, means at one end of said elongated member for retaining said member in fixed axial position with respect to said driven shaft, and means at the opposite end of said elongated member for engaging the driving shaft to prevent axial separation of said driving shaft, stub shaft and driven shaft, said elongated member having sufficient clearance in said shafts to permit a small amount of misalignment of the driving and driven shafts.

9. A shaft coupling for connecting a driving shaft and a hollow driven shaft, said coupling comprising a stub shaft adapted to fit into said hollow driven shaft, means for effecting a driving connection between the stub shaft and the driven shaft, resilient means for connecting said driving shaft to the stub shaft to effect a driving connection therebetween, said driving shaft and stub shaft being hollow, an elongated member extending axially through the driving shaft and stub shaft, internal abutment means in said hollow driven shaft, means at one end of said elongated member for engaging said abutment means, and means at the opposite end of the elongated member for engaging the driving shaft to prevent axial separation of the driving shaft, stub shaft and driven shaft.

10. A shaft coupling for connecting a driving shaft and a driven shaft, the driven shaft being hollow and having splines in its internal surface, said coupling comprising a stub shaft fitting into said hollow driven shaft, said stub shaft having splines thereon cooperating with the internal splines of the driven shaft to effect a driving engagement therewith, resilient means for connecting said driving shaft to the stub shaft to effect a driving connection therebetween, said driving shaft and stub shaft being hollow, an elongated member extending axially through the driving shaft and stub shaft, internal abutment means in said hollow driven shaft, means at one end of said elongated member for engaging said abutment means, and means at the opposite end of the elongated member for engaging the driving shaft to prevent axial separation of the driving shaft, stub shaft and driven shaft.

11. A resilient shaft coupling for connecting two shafts, said coupling comprising a first spring anchor mounted on one of said shafts, said first spring anchor being circular and having a plurality of generally radial slots therein, a second spring anchor mounted on the other of said shafts, said second spring anchor being annular and having a plurality of generally radial slots in its inner periphery, said two spring anchors being disposed in the same plane with their slots coinciding in angular position, a plurality of flat leaf springs disposed in a pack in each opposed pair of radial slots in the first and second spring anchors to effect a resilient driving connection between the spring anchors, said leaf springs being notched at their ends to engage the spring anchors at the bottoms of the radial slots and to be held in position solely by such engagement, and an annular retaining plate secured to said second spring anchor and overlapping the first spring anchor to prevent axial separation of the spring anchors, said retaining plate having radial openings therein opposite the packs of springs to avoid interference with the springs.

12. A resilient shaft coupling for connecting two shafts, said coupling comprising a first spring anchor mounted on one of said shafts, said first spring anchor being circular and having a plurality of generally radial slots therein, a dished support plate mounted on the other of said shafts, said support plate having a plurality of radial notches in its periphery, a second spring anchor secured to the support plate, said second spring anchor being annular and having a plurality of generally radial slots in its inner periphery, the second spring anchor being secured to the support plate with the radial slots coinciding in position with the notches of the support plate, said two spring anchors being disposed in the same plane with their slots coinciding in angular position, a plurality of flat leaf springs disposed in a pack in each opposed pair of radial slots in the first and second spring anchors to effect a resilient driving connection between the spring anchors, said leaf springs being notched at their ends to engage the spring anchors at the bottoms of the radial slots and to be held in position solely by such engagement, and an annular retaining plate secured to said second spring anchor and overlapping the first spring anchor to prevent axial separation of the spring anchors, said retaining plate having radial openings therein opposite the packs of springs to avoid interference with the springs.

JOSEPH E. MULHEIM.